March 7, 1939.  F. MALOTT  2,150,073
VEHICLE SUSPENSION MEANS
Filed Jan. 12, 1938  2 Sheets-Sheet 1

Inventor
Floyd Malott

By Clarence A. O'Brien
Hyman Berman
Attorneys

March 7, 1939.                F. MALOTT                2,150,073
                       VEHICLE SUSPENSION MEANS
                         Filed Jan. 12, 1938            2 Sheets-Sheet 2
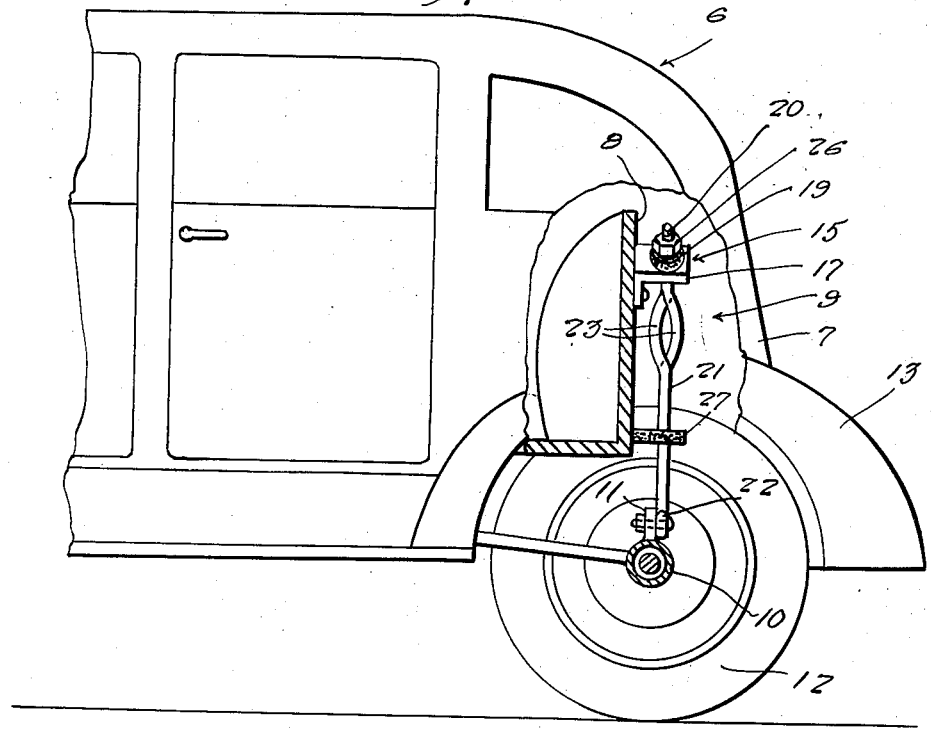
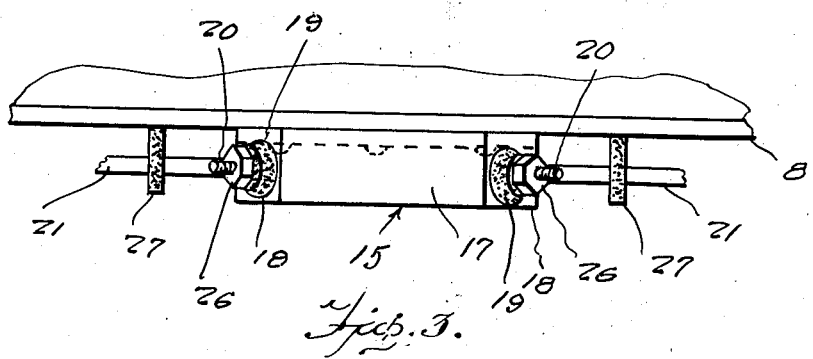
Inventor
Floyd Malott
By Clarence A. O'Brien
   Hyman Berman
                    Attorneys Patented Mar. 7, 1939

2,150,073

UNITED STATES PATENT OFFICE 2,150,073

VEHICLE SUSPENSION MEANS

Floyd Malott, Marathon, Ohio

Application January 12, 1938, Serial No. 184,687

2 Claims. (Cl. 280—124)

This invention relates to yieldable self-adapting and appropriately compensating suspension means designed to afford a partial connection between a vehicle body and its underlying chassis or running gear.

The outstanding purpose of the invention is to generally improve upon constructions in this classification by providing an arrangement characterized by simplicity and reduced costs in manufacturing, and efficiency in operation such as is calculated to give adequate riding facilities to the occupants of the car.

The preferred embodiment of the invention is exemplified through the adoption and use of an assembly characterized by intersecting rod or link members, these being pivotally attached at their lower ends to the axle and adjustably anchored at their upper ends on an adapter fixture rigidly secured to the body, spring means being incorporated to provide the desired stress and strain distributing results.

Other features and advantages of the invention will become apparent by considering the accompanying drawings in conjunction with the succeeding specific description.

In the drawings:

Figure 2 is a side view of the rear end portion of the assemblage seen in Figure 1, portions being broken away and appearing in sections to disclose the invention at 90 degrees to the angle seen in Figure 1.

Figure 3 is a top plan view with the body and wheel structure removed showing the top of the rear seat and looking down on top of the anchoring brackets and associated features.

Figure 1:
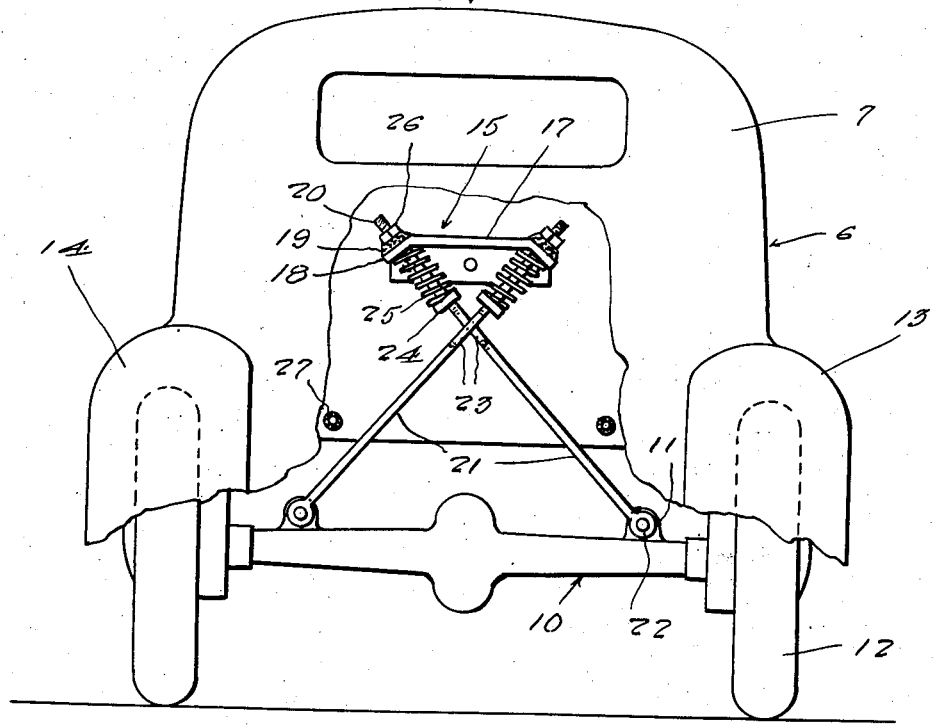
Figure 1 is a rear end elevation of a motor vehicle showing the wheel supported chassis and body, a portion of the body being broken away to expose the subject matter of the invention.
Figures 4, 5:
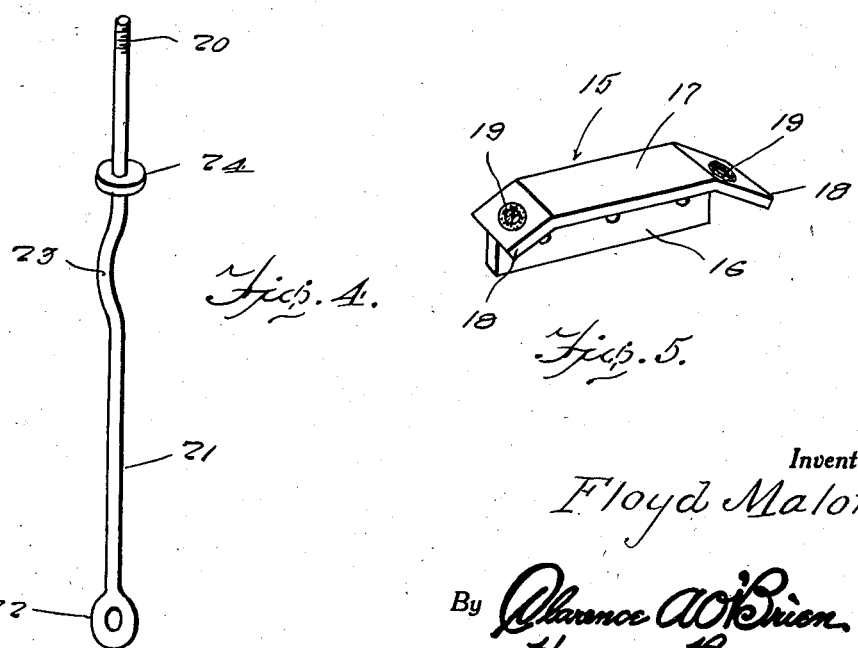
Figures 4 and 5 are perspective detail views of one of the links or rods and the adapter or anchoring brackets respectively.

In accordance with my conception the vehicle body 6 may be of appropriate construction. In the present instance however, the rear end 7 drops down in spaced relation to what may be called the relatively stationary member 8 forming the upright of the back seat construction. These features define between themselves a compartment 9 which houses the features constituting the essence of the invention. The running gear or chassis is indicated at 10 and includes the axle housing having attaching lugs or ears 11 at the points indicated. The ground engaging and traction wheels are denoted at 12 and it will be observed that the fenders 13 are comparatively huge and have sufficient clearance between themselves and the wheels to allow the lateral rocking of the body 6 in relation to what may be called the longitudinal center of the chassis.

The adapter bracket or anchoring fixture is indicated at 15 and is preferably such as to include a vertical attaching flange 16 and a horizontal thrust flange 17. The end portions 18 of the flange 17 are directed downwardly and apertured and provided with rubber bushings or guides 19. These serve to accommodate the threaded end portions 20 of the pair of companion rods or links 21. The links 21 are disposed in intersecting relationship and are formed at their lower ends with anchoring and pivoting eyes 22. That is to say, the eyes 22 are pivoted to the aforementioned lugs or ears 11. The intersecting portions of the respective links 21 are formed with longitudinally curved bends 23 these being disposed in intersecting relationship as brought to advantage in Figures 1 and 2 of the drawings. Outwardly beyond the bends are abutment flanges or shoulders 24 to accommodate the coiled springs 25. The coiled springs bear at one end against the stops or collars 24 and at their opposite ends against the flange terminals 18. The threaded ends of the rods go through and beyond the guide bushings where they carry adjusting and retention and assembling nuts 26. Thus the spring equipped ends of the intersecting rods are centrally anchored on the body of the car. The body of the car is suspended by this structure above the axle or running gear. The numbers 27 merely designate buffers or bumpers of appropriate cushioning properties, these being attached to the lower portion of the panel 8 outwardly of the intersecting rods.

Briefly then, we are concerned with a wheel supported running gear and a body above the same, there being connecting rods between the two, said rods being pivotally attached to the running gear, having their intermediate portions intersecting and having their opposite end portions spring anchored on the body. In such instances as the body is equipped with fenders, the fenders are sufficiently large to house and accommodate the wheels with requisite clearance. The bumpers 27 are merely safeguarding features to coact with the stay links or rods 21. The rods are ordinarily self-accommodating and adapting and provide a substantially automatically operable resilient support or suspension means for the body. The arrangement is fairly sensitive and adjustable to meet varying conditions. Requisite balance is attained and equality in distribution of stress and strain is maintained. In fact, it is believed that the device is sufficient to promote desired riding properties in an assemblage of the type disclosed.

By way of conclusion it is to be explained that the means depicted in Figures 1 and 2 constitutes the sole means for operatively adjoining the body to the wheel supported chassis. That is to say, this is the suspension means for the entire rear end of the body. This obviously means, therefore, that the usual leaf springs (not shown) employed at this end of the body and chassis are eliminated in accordance with the ideas of this invention. At the front, however, the usual leaf spring or equivalent means (not shown) is employed. I mention this to bring out the fact that the structure seen in the drawings is in no sense to be considered as an auxiliary shock absorber. That is to say, it is the sole suspension means for the complete rear end of the vehicle body.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:
1. In a structure of the class described, a running gear including a wheel supported axle, attaching ears on said axle, a pair of duplicate complemental stay rods having eyes at their lower ends pivotally attached to said ears, a body supported above said axle, said body including a compartment to accommodate and house said stay rods, the intermediate portions of the stay rods being disposed in intersecting relationship, and an adapter bracket supported rigidly in said compartment, the ends of the stay rods adjacent said bracket being yieldably and adjustably attached to said bracket.

2. In a construction of the class described, an anchoring bracket adapted for attachment to the rear seat of an automobile comprising an attaching flange and an adapting flange, the ends of the adapter flange being directed laterally and downwardly and apertured and provided with resilient guide bushings, a pair of duplicate stay rods having their intermediate portions formed with bends, the bends being adapted for disposition in intersecting relationship, the lower ends of said rods being provided with attaching eyes, the opposite ends of the rods being screw-threaded and passing through the guide bushings, retention nuts on said screw-threaded ends, shoulders on said rods adjacent to said brackets and coiled springs surrounding the rods and bearing at one end against the shoulders and at opposite ends against said brackets.

FLOYD MALOTT.